April 30, 1968    J. DE MONTREMY ET AL    3,380,794
METHOD OF PHOTOGRAPHING MOTION PICTURES
Filed Feb. 17, 1965

INVENTOR
Jean de Montremy
Jean Véran Dejoux
BY
Emery, Whittemore, Sandoe & Graham
ATTORNEYS

United States Patent Office 3,380,794
Patented Apr. 30, 1968

3,380,794
METHOD OF PHOTOGRAPHING MOTION PICTURES
Jean de Montrémy and Jean Véran Dejoux, Paris, France, assignors to Nicholas Reisini, New York, N.Y.
Filed Feb. 17, 1965, Ser. No. 433,435
Claims priority, application France, Feb. 19, 1964, 964,417
5 Claims. (Cl. 352—44)

ABSTRACT OF THE DISCLOSURE

A method of photographing motion pictures in which successive images are recorded at separate exposure areas in two separate series, with each exposure at one exposure area occurring and being completed during a time when the other exposure area is not exposed. The duration of each exposure is independent of the frequency of exposure.

---

This invention relates to methods of photographing motion pictures, and pertains more particularly to methods of photographing motion pictures in which successive images are recorded alternately in two separate series, i.e. the odd numbered images are recorded in one series and the even numbered images are recorded in a separate second series.

The method of the present invention is particularly adapted for the photographing of motion pictures for projection in accordance with the method described in our copending patent application Ser. No. 362,415, filed Apr. 24, 1964, now U.S. Patent No. 3,271,097, dated Sept. 6, 1966. According to that method successive images recorded alternately on two separate and distinct bands or strips of film are projected in such manner that an odd numbered picture and an even numbered picture are projected as a pair in superposed position. During the projection of each pair, the luminous intensity of the image of the first picture thereof is decreased gradually from a maximum to zero and the luminous intensity of the image of the second picture of the pair is increased gradually from zero to the same maximum. When the luminous intensity of the image of the first picture which has been decreasing gradually is near zero, the film from which that image is projected is moved out of projection position and the third picture of the series is moved into projection position so that it is paired with the second picture. Thereafter, the luminous intensity of the image of the third picture is increased gradually, while the luminous intensity of the image of the second picture is decreased gradually. The foregoing sequence is then repeated time after time with each new picture which is moved into projection position paired for projection with the preceding picture. The foregoing method of projection has sometimes been referred to as a "lap dissolve" method.

One of the advantages of the foregoing method of projection is that it makes possible a great reduction in the speed of projection, i.e. satisfactory projection has been achieved at projection speeds of from 3 to 10 frames per second.

It is an object of the present invention to provide a method of photographing motion pictures for projection by the above method, in which the successive images are recorded alternately on two separate bands or strips of sensitized film, or alternatively are recorded alternately on two separated parallel areas of a single band or strip of sensitized film which may subsequently be cut to provide two separate strips.

It is a further object of the invention to provide a method of photographing such motion pictures utilizing a single objective lens system.

It is a further object of the invention to provide for splitting the beam of light passing through said lens system to form two divergent beams directed toward two separate focal plane areas where the images are to be recorded, and for exposing said areas alternately.

Other objects and advantages of the invention will appear hereinafter.

According to the present invention, a beam of light carrying the images to be photographed and entering a camera through a single objective lens is split to form two divergent beams directed toward two separate focal plane areas on which the images may be focused. Thus, at any given instant, identical images may be focused simultaneously on two separate areas. However, since it is desired to record successive, rather than simultaneous images, the respective divergent beams are alternately intercepted by suitable shutters as hereinafter explained so as to permit alternate exposure of said separate focal plane areas at successive periods of time. Thus the beam directed toward one of said focal plane areas is allowed to impinge on the area during the desired period of exposure, say $\frac{1}{25}$ of a second, and is then intercepted during the remainder of the cycle. Thereafter, during the period of interception of the first beam, the beam directed toward the other of said focal plane areas is allowed to impinge on this area during the desired period of exposure (always equal to the exposure period of the first beam), and is then intercepted during the remainder of the cycle.

The periods of exposure may be of any desired duration, depending on the usual considerations for good photography such as light conditions, movement of the subject, speed of lens, film emulsion speed and the like. For example, the periods of exposure may vary from $\frac{1}{25}$ of a second to $\frac{1}{1000}$ of a second. It will be noted, however, that the periods of exposure are of considerably less duration than the periods of interception. For example, assuming a total of ten exposures per second, there will be only five exposures at one focal plane area, and five exposures at the other focal plane area during a period of one second. Therefore, assuming an exposure period of $\frac{1}{25}$ of a second, five exposures would require a total of $\frac{5}{25}$ of a second, leaving a total of $\frac{20}{25}$ of a second for five periods of interception, each having a duration of $\frac{4}{25}$ of a second. Thus, during such periods of interception, there is ample time for movement of sensitized film on which images are recorded.

The intervals between successive exposures should be equal. That is, the interval between beginning of the first exposure at one focal plane area and the beginning of the next successive exposure at the other focal plane area should be equal to the interval between the latter and the beginning of the second exposure at the first focal plane area, and so on.

The duration of exposure is preferably independent of the frequency of exposure. That is, assuming that the desired exposure period is $\frac{1}{25}$ of a second, it remains at $\frac{1}{25}$ of a second regardless of whether the frequency of exposure is five per second, or eight or ten per second.

The sensitized film strips on which the images are to be recorded may be fed intermittently by film feeding mechanisms well known in the art which form no part of the present invention. Likewise, exposure of the sensitized film strips and the interception of the light beams may be controlled by the use of shutter mechanisms well known in the art. It is only necessary that the mechanism for feeding the film strips be interconnected with the respective shutter mechanisms in such manner that each film strip is advanced during a period when its respective light beam is intercepted by the shutter, and is held stationary during periods of exposure.

The sensitized film strips may be of any desired width, as for example, films of the conventional widths of 8 mm., 16 mm., 35 mm. or 70 mm. may be used.

Suitable arrangements for performing the method of the invention are illustrated diagrammatically in the drawings, in which, FIG. 1 is a diagramamtic representation of a camera in which the method of the invention may be practiced to record images on two separate strips of sensitized film.

Figure 1:
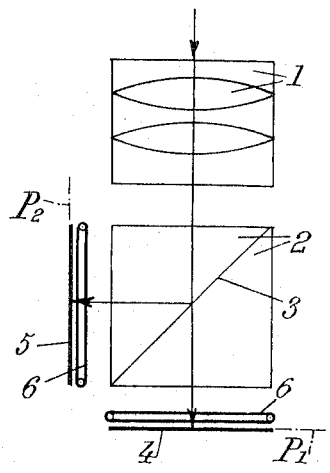

Referring to FIG. 1, the invention is illustrated as used in a camera in which a beam of light entering through an objective lens system 1 is intercepted by an optical block 2 consisting of two matching triangular prisms held together in face to face relationship along the hypotenuse 3. The prisms split the entering beam to form two divergent beams directed toward the respective focal planes $P_1$ and $P_2$ arranged at right angles. Thus, one image may be directly focused at the focal plane $P_1$ and another similar image may be focused at the focal $P_2$ by reflection from the face 3.

Two separate sensitized film strips 4 and 5 are mounted to be fed across the areas of the focal planes $P_1$ and $P_2$, respectively, which are to be exposed, and each of said strips is advanced intermittently in a manner and by mechanisms well known in the art. The said film strips are advanced alternately, i.e. strip 4 is advanced while strip 5 is held stationary and vice versa.

Shutters 6 and 6' are mounted close to the respective focal planes $P_1$ and $P_2$ in position to intercept the beams directed toward the respective focal planes and to expose the sentitized films at said planes in the manner previously described. Various types of shutters known in the art may be used, but a slotted shutter of the so-called focal plane type is preferred.

Figure 2:
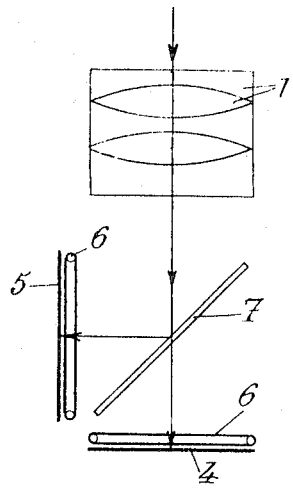
FIG. 2 is a similar view of a modified form.

In FIG. 2, the arrangement is similar, except that a semi-transparent, semi-reflecting mirror 7 is substituted for the prisms 2 of FIG. 1. Such mirrors are well known in the art.

Figure 3:
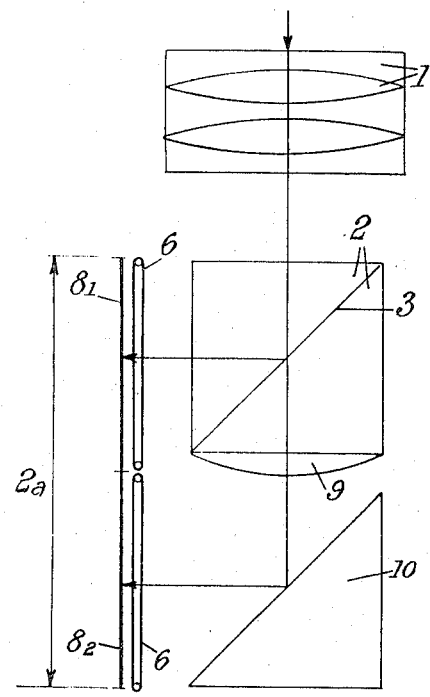
FIG. 3 is a similar view of a modified form in which the successive images are recorded alternately on two separate parallel areas of a single strip of sensitized film.
Figures 5, 6:
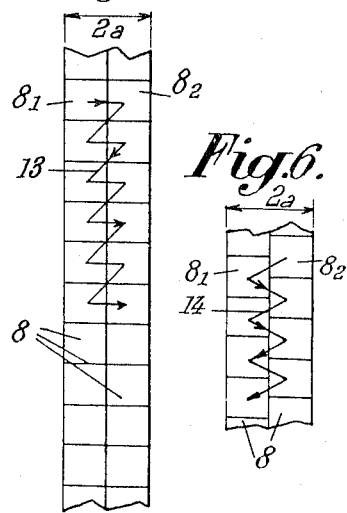
FIG. 5 is a diagram of a film strip showing one manner in which the successive images may be recorded on two separate parallel areas of a single strip of film.
FIG. 6 is a similar view of a film strip showing an alternative manner in which such images may be recorded.

In the arrangement illustrated in FIGS. 3 and 5, a single strips of senitized film 8 is used having a width 2a divided longitudinally into two separate parallel areas $8_1$ and $8_2$ covering two separate focal plane areas lying in a common focal plane. In this arrangement the beam of light entering through the objective lens system 1 is intercepted by an optical block 2 similar to that of FIG. 1 consisting of two matching triangular prisms held together along the hypotenuse 3. Again, as in FIG. 1, the prisms split the entering beam to form two divergent beams, one of which, reflected from the hypotenuse 3, may be focused at the area $8_1$. The other beam which passes through the prisms impinges on the hypotenuse of a reflecting prism 10 and is reflected to be focused at the area $8_2$. A correcting lens 9 may be placed between the prisms 2 and prism 10 to compensate for the increased length of the beam which impinges on area $8_2$ as compared with the length of the beam which impinges on area $8_1$.

FIGURES 5 and 6 illustrate alternative methods of recording successive images on the areas $8_1$ and $8_2$ of the film strip 8. As indicated by the arrow path 13 of FIG. 5, two successive images are recorded on a pair of transversely opposed frames of the areas $8_1$ and $8_2$, respectively, the film strip being held stationary until exposure of both frames is completed. Then the film strip is advanced one frame length during a period when both of the divergent beams are intercepted by their respective shutters. Then the next two successive images are recorded on the next pair of transversely opposed frames while the film is held stationary, and so on.

Alternatively, as indicated by the arrow path 14 of FIG. 6, one image is recorded on a frame of area $8_2$ while the film strip is held stationary. Then, the film strip is advanced one-half frame length during a period when both of the divergent beams are intercepted by their respective shutters. Then the next successive image is recorded on a frame of area $8_1$ while the film strip is again held stationary. Then the film strip is again advanced one-half frame length and so on.

After recording is completed, or preferably after development and printing of exhibition prints, the film strips may be cut along the line 15 to form two separate film strips suitable for projection by the method described in our copending patent application aforesaid.

Figure 4:
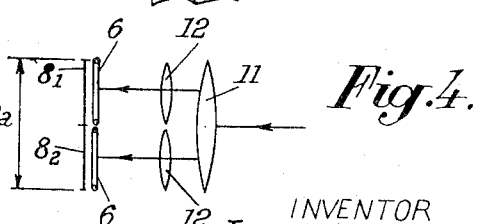
FIG. 4 is a similar view of a modified form adapted for the same purpose.

FIG. 4 illustrates an alternative arrangement for recording images on a single sensitized film strip 8 such as shown in FIGS. 5 and 6. In FIG. 4 a lens system comprising a large condenser lens 11 and two smaller lenses 12 are interposed between the objective lens system (not shown) and the focal plane occupied by the film 8. The condenser lens 11 transforms the incident beam into parallel beams which impinge on the lenses 12 which focus similar images on the areas $8_1$ and $8_2$ respectively. The operation of the shutters and film feeding mechanism is as previously described.

It will be understood that the invention may be variously modified and embodied within the scope of the subjoined claims.

What we claim is:

1. The method of photographing motion pictures consisting of a series of successive images which comprises splitting a beam of light passing through a single objective lens system to form two divergent beams directed toward two separate focal plane areas, alternately exposing one of said separate areas to one of said divergent beams and intercepting said beam to prevent exposure of said area thereto, alternately exposing the other of said separate areas to the other of said divergent beams and intercepting said beam to prevent exposure of said area thereto, the periods of exposure of said separate areas being equal and occurring in alternation, and the periods of exposure being of less duration than the periods of interception, with each exposure of one area occurring and being completed during a time when the other of said areas is not exposed, the duration of said periods of exposure being independent of the frequency of exposure.

2. The method claimed in claim 1 in which sensitized film is moved intermittently across said focal plane areas, being held stationary during periods of exposure and being advanced during periods of interception.

3. The method claimed in claim 1 in which the separate focal plane areas are angularly disposed, and in which a separate strip of sensitized film is moved intermittently across each of said focal plane areas, each strip being held stationary during periods of exposure thereof, and being advanced during periods of interception.

4. The method of photographing motion pictures consisting of a series of successive images which comprises splitting a beam of light passing through a single objective lens system to form two divergent beams directed toward two separate focal plane areas lying in a common plane, alternately exposing one of said separate areas to one of said divergent beams and intercepting said beam to prevent exposure of said area thereto, alternately exposing the other of said separate areas to the other of said divergent beams and intercepting said beam to prevent exposure of said area thereto, the periods of exposure of said separate areas occurring in alternation, with each exposure of one area occurring and being completed during a time when the other of said areas is not exposed, in which a single strip of sensitized film is moved intermittently across said focal plane areas, the strip being held stationary during two successive periods of exposure of two separate areas thereof, and being advanced during a period of interception of both of said divergent beams occurring after the second period of exposure.

5. The method of photographing motion pictures consisting of a series of successive images which comprises splitting a beam of light passing through a single objective lens system to form two divergent beams directed toward two separate focal plane areas lying in a common plane, alternately exposing one of said separate areas to one of said divergent beams and intercepting said beam to prevent exposure of said area thereto, alternately exposing the other of said separate areas to the other of said divergent beams and intercepting said beam to prevent exposure of said area thereto, the periods of exposure of said separate areas occurring in alternation, with each exposure of one area occurring and being completed during a time when the other of said areas is not exposed, in which a single strip of sensitized film is moved intermittently across said focal plane areas, said strip being held stationary during periods of interception of both of said divergent beams occurring after each period of exposure.

References Cited
UNITED STATES PATENTS

| | | | |
|---|---|---|---|
| 540,545 | 6/1895 | Gray | 352—68 |
| 3,035,484 | 5/1962 | Karauias | 352—68 X |

FOREIGN PATENTS

| | | |
|---|---|---|
| 650,879 | 3/1951 | Great Britain. |
| 1,316,602 | 12/1962 | France. |

JULIA E. COINER, *Primary Examiner.*